United States Patent [19]

Syversten et al.

[11] Patent Number: 4,742,979
[45] Date of Patent: May 10, 1988

[54] CABLE HANGER

[76] Inventors: William O. Syversten, Village Rd., P.O. Box 623, South Newbury, N.H. 03272; Roland D. Sabourin, 20 Brookside Mobile Ter., Allenstown, N.H. 03275; Maxwell Matthews, 6 Beaver Brook Cir., Amherst, N.H. 03031

[21] Appl. No.: 16,836

[22] Filed: Feb. 19, 1987

[51] Int. Cl.$^4$ .................................................. F16L 3/08
[52] U.S. Cl. ........................................ 248/65; 248/303
[58] Field of Search ................... 248/303, 302, 65, 59, 248/62; 174/158 F, 160, 161 F, 163 F, 170; 24/129 C, 131 R

[56] References Cited

U.S. PATENT DOCUMENTS

| | | |
|---|---|---|
| 499,549 | 6/1893 | Hunter et al. . |
| 1,536,678 | 5/1925 | Markowski ...................... 248/302 X |
| 1,912,704 | 6/1933 | Graham .......................... 248/302 X |
| 2,641,079 | 6/1953 | Oster ............................... 248/302 X |
| 2,846,174 | 8/1958 | Sewell ............................. 248/302 X |
| 3,064,933 | 11/1962 | Brasty ............................ 24/131 R X |
| 3,198,471 | 8/1965 | Meyer . |
| 3,250,309 | 5/1966 | Gyllenberg ..................... 24/129 C X |
| 3,263,026 | 7/1966 | Kihs . |
| 3,381,824 | 5/1968 | Blumenschein . |
| 3,504,108 | 3/1970 | Kihs . |
| 3,599,916 | 8/1971 | Szabo . |
| 3,752,902 | 8/1973 | Wilson ............................. 174/163 F |
| 3,883,934 | 5/1975 | Rochfort . |
| 4,232,847 | 11/1980 | Cooper . |
| 4,438,894 | 3/1984 | Yaotani et al. . |
| 4,560,126 | 12/1985 | Judkins et al. . |

Primary Examiner—J. Franklin Foss
Attorney, Agent, or Firm—Lee A. Strimbeck

[57] ABSTRACT

A cable support or hanger for holding cable or wiring above suspended ceilings comprises a single piece of wire configured to have an upturned U at its upper end to hold the cable. One leg of the U bends sharply downwardly and the wire then angles over to a first straight portion and thereafter angles back to a second straight portion. The wire then terminates in a toe. The hanger is adapted to be wrapped by hand onto a support wire of a suspended ceiling and firmly engage the support wire with a multiplicity of contact points that prevent sliding and/or disengagement.

5 Claims, 1 Drawing Sheet

CABLE HANGER

The present invention is a cable support or hanger for cable or wiring above suspended or dropped ceilings.

BACKGROUND

At the present time, the majority of the cable and wiring above suspended ceilings is just laid on top of the grid and tiles. This makes removal and replacement of the ceiling tiles difficult. To put it in the electrician's slang, the wiring so laid above a suspended ceiling looks like "spaghetti". This "spaghetti" can be pushed around until it is unknowingly resting on top of a light fixture thus causing a potential fire hazard in conflict with the National Electrical Code 1984 Edition by NFPA, Article 410-22 Fixture Wiring which states: "Wiring on or within fixtures shall be neatly arranged and shall not be exposed to physical damage. Excess wiring shall be avoided. Conductors shall be so arranged that they shall not be subjected to temperatures above those for which they are rated."

There are no inexpensive easy to use hangers for holding such wires on the market today. Sometimes expensive cable tray, conduit systems, or elaborate trapeze systems are used to neatly arrange and tie down the wiring. Inexpensive tape, string or plastic ties are also used.

PRIOR ART

A pre-examination search developed the following patents:

| | | | |
|---|---|---|---|
| 499,549 | Hunter | 3,599,916 | Szabo |
| 3,198,471 | Meyer | 3,883,934 | Rochfort |
| 3,263,026 | Kihs | 4,232,847 | Cooper |
| 3,381,824 | Blumenschein | 4,438,894 | Yaotani et al |
| 3,504,108 | Kihs | 4,560,126 | Judkins et al |

Only the patents to Judkins and Meyer describe brackets for use with suspended ceilings. None of the patents show a hanger having the specific configuration of the hanger of the present invention.

THIS INVENTION

The present invention is a cable support or hanger made from a single piece of resilient wire. It is a multi-point friction device with a looped or U-shaped top and a supporting base which can be firmly attached to a suspended ceiling vertical support wire. The U-shaped top securely holds various types of electrical cables and wiring.

In brief compass, the present invention is a cable hanger comprising a resilient wire configured to be clipped or wrapped by hand onto a suspended ceiling support wire. It has at one end a toe adapted to engage one side of the support wire. The toe turns into a leg running generally parallel to the support wire upwardly and then bends and runs over the other side of the support wire to another straight section running generally parallel to the support wire, following which the wire crosses under the support wire on the one side and flows into a tight U-bend which crosses over the other side of the wire and terminates in an upward opening U-bend adapted to receive the cable.

DRAWING

In the drawings

Figure 1:
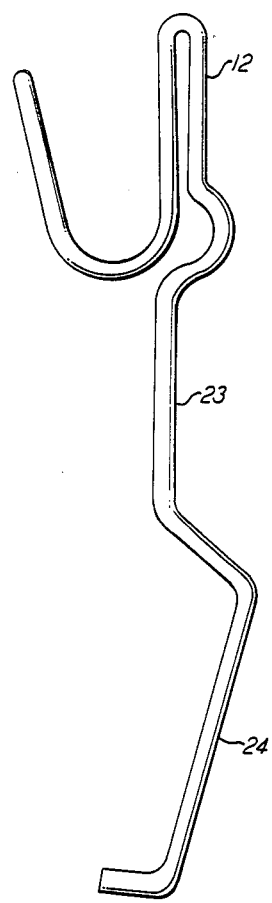
FIG. 1 shows a hanger of the invention by itself.
Figure 2:
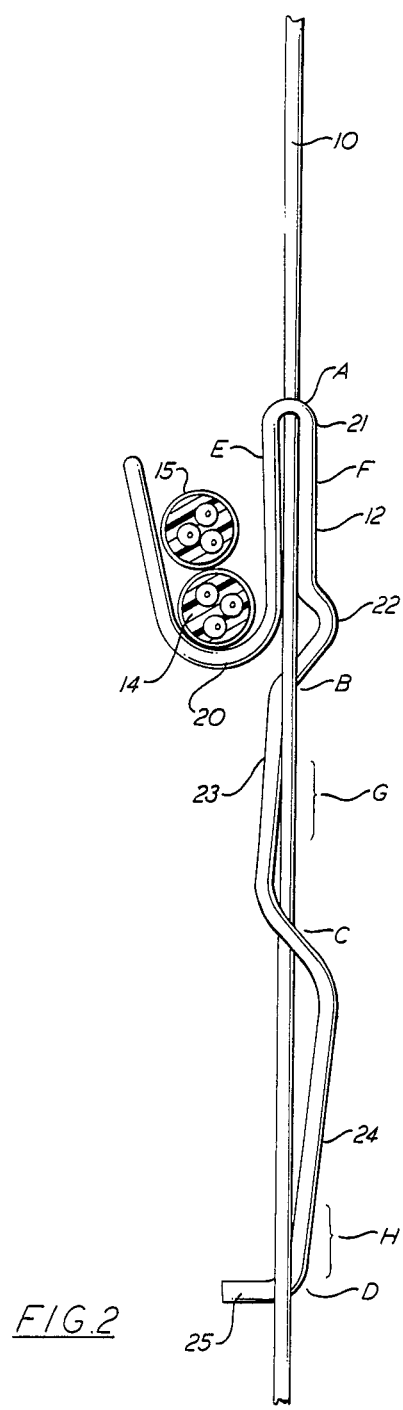
FIG. 2 shows the hanger wrapped onto a support wire of a suspended ceiling.

With reference to the drawings, a vertical support wire 10 suspends a ceiling (not shown) in a known manner. Clipped to the support wire is a hanger of this invention generally indicated at 12. The hanger 12 is made of a single piece of resilient wire such as 0.105 diameter basic galvanized. The hanger can have a length preferably of from 5 to 7 inches.

The hanger is configured to firmly grip the wire 10 as illustrated with essentially four points of major contact (A,B,C,D) and four points of minor cotact (E,F,G,H). Additional points of contact can be obtained by adding further crossovers and legs although the added gripping action is not generally required.

Beginning at the upper end, wire 12 has an up turned open U 20 adapted to receive cables or wiring such as cables 14 and 15. The right leg of the U turns downward in a tight U-bend 21 on one side of the support wire 10 and ends in a bend 22 to the right at the end of the tight U-bend leg. The wire then angles to the left to the other side of the support wire and goes into a straight portion 23 running downwardly parallel with support wire 10 and about on line with the line of the right leg of said open U. The wire thereafter angles to the right crossing over the support wire 10 to a second straight portion 24 which runs when the hanger is secured downwardly on a line generally parallel to but offset from the line of the right leg of the open U. The wire then terminates in a left turning toe 25 that crosses underneath support wire 10.

FIG. 1 shows hanger 12 unrestrained. It will be noted that leg 24 is angled with respect to leg 23 10° to 20°, e.g. 15°. Preferably all of the hanger lies substantially in one plane. However, legs 23 and 24 can be angled downwardly and upwardly, respectively, to increase the gripping action.

The hanger is applied to support wire 10 by engaging the sharp bend 21 on the wire, then pulling portions 23 and 24 underneath support wire 10, thereafter flexing portion 24 up and over the other side of the wire and with a slight twist engaging toe 25 underneath the wire. The tension and multi-friction points of the hanger causes the hanger to firmly grip support wire 10. The tight loop 21 does tend to exert a gripping action on support wire 10 preventing the hanger from sliding although the hanger can be readily adjusted upwardly and downwardly as may be desired. After the hanger is placed, then such cables and wiring as may be desired are placed in the U 20. If, with the passage of time, the hanger 12 should tend to slip downwardly on wire 10, toe 25 will engage the twisted lower end of support wire 10 (not shown) and will prevent any further sliding and the hanger will continue to hold the cables 14 and 15 off the ceiling tiles.

As illustrated, the open U may have an internal radius in the range of ¼ to ½ inch, e.g. 5/16 inch and legs of a length in the range of ¾ to 1½ inch, e.g. 1¼ inch—the tight U-bend 21 may have an internal radius in the range of 1/32 to ⅛ inch, e.g. 1/16 inch. Portions 23 and 24 may have lengths in the range of 1 to 2 inches, e.g. 1¾ inch.

Of course sufficient of hangers 12 are placed on the supporting wires of a suspended ceiling to give a track along which wires can be laid as needed.

While it is contemplated that hanger 12 will be made of round wire, the cross section of the wire used could be square, rectangular, oval or such other shapes as may be desired. If a wire ribbon were used, there will be sharp edges contacting the support wire 10 which would help further arrest any movement of the hanger 12 relative to the support wire 10.

We claim:

1. A cable hanger comprising a resilient wire configured to be wrapped by hand onto a support wire and having at one end a toe adapted to engage under one side of said support wire, said toe turning into a leg running for a distance along said support wire, the leg then bending and running over the other side of said support wire, then bending and running generally parallel to said support wire, then crossing under said support wire on said one side and flowing into a tight U-bend crossing over said other side, and terminating in an open U-bend adapted to receive a cable.

2. A cable hanger comprising a single piece of resilient wire configured to be wrapped by hand onto a suspended ceiling support wire and having at one end a toe adapted to engage one side of said support wire, said toe turning into a series of legs configured to run for a distance alternately on either side of said support wire with the crossovers between said legs being alternately on one side and then the other of said support wire and said wire then turning into a tight U-bend adapted to cross over said support wire and terminating in an open U-bend adapted to receive a cable.

3. A hanger consisting of a single piece of wire configured as follows:
the wire having at one end an upturned open U, one leg of said U turning downward in a tight U-bend, the wire having an outward protuberance at the end of the tight U-bend leg and then angling to a first straight portion running downward about in line with the line of said one leg, the wire thereafter angling to a downwardly angling second straight portion and then terminating in a toe turned at about right angles to the line of said second straight portion in the direction of said U.

4. The hanger of claim 3 wherein:
said U has an internal radius in the range of ¼ to ½ inch and legs having a length in the range of ¾ to 1½ inches; said tight U-bend has a radius in the range of 1/32 to ⅛ inch; said first and second straight portions have lengths in the range of 1 to 2 inches; and said second straight portion is angled with respect to said first straight portion in the range of 10° to 20° and wherein the whole of the hanger lies substantially in the same plane.

5. A cable hanger consisting of a single piece of wire configured as follows:
said wire having at one end an upturned open U adapted to receive a cable, the right leg of said U turning downward in a tight U-bend and ending in bend to the right at the end of the tight U-bend leg, the wire then angling to the left to a first straight portion running downwardly about in line with the line of said right leg, the wire thereafter angling to the right to a downwardly angling second straight portion and then terminating in a toe turned to the left.

* * * * *